United States Patent
Zhuang et al.

(10) Patent No.: US 10,237,793 B2
(45) Date of Patent: Mar. 19, 2019

(54) ACCESS CONTROL METHOD AND APPARATUS, AND NETWORK DEVICE

(71) Applicant: HUAWEI TECHNOLOGIES CO., LTD., Shenzhen, Guangdong (CN)

(72) Inventors: Hongcheng Zhuang, Shenzhen (CN); Zezhou Luo, Shenzhen (CN); Youwen Yi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 5 days.

(21) Appl. No.: 15/586,417

(22) Filed: May 4, 2017

(65) Prior Publication Data

US 2017/0238218 A1 Aug. 17, 2017

Related U.S. Application Data

(63) Continuation of application No. PCT/CN2014/091245, filed on Nov. 17, 2014.

(51) Int. Cl.
*H04W 36/04* (2009.01)
*H04B 17/345* (2015.01)
(Continued)

(52) U.S. Cl.
CPC .......... *H04W 36/04* (2013.01); *H04B 17/327* (2015.01); *H04B 17/336* (2015.01);
(Continued)

(58) Field of Classification Search
CPC . H04W 36/04; H04W 36/0061; H04W 36/30; H04B 17/345; H04B 17/336; H04B 17/327

See application file for complete search history.

(56) References Cited

U.S. PATENT DOCUMENTS

| | | | |
|---|---|---|---|
| 6,014,565 A | 1/2000 | Bonta | |
| 2009/0161617 A1* | 6/2009 | Abedi | H04W 16/10 370/329 |
| 2010/0214997 A1* | 8/2010 | Tao | H04W 16/12 370/329 |
| 2015/0319622 A1* | 11/2015 | Sun | H04W 72/082 455/454 |

FOREIGN PATENT DOCUMENTS

| | | |
|---|---|---|
| CN | 101076178 A | 11/2007 |
| CN | 101083831 A | 12/2007 |

(Continued)

OTHER PUBLICATIONS

International Search Report dated Aug. 28, 2015 in corresponding International Application No. PCT/CN2014/091245.

(Continued)

*Primary Examiner* — Kamran Afshar
*Assistant Examiner* — Minjung Kim
(74) *Attorney, Agent, or Firm* — Staas & Halsey LLP

(57) ABSTRACT

The present disclosure provides an access control method and apparatus, and a network device. The method includes: performing grid partitioning on a target cell covered by a wireless access point, to obtain multiple grids; grouping, based on a neighboring cell of the target cell, grids that satisfy a preset condition in the multiple grids into one or more interference clusters; calculating an access offset of each of the interference clusters; and sending, to a user in each interference cluster, an access offset of a corresponding interference cluster, so that the user selects a cell based on the access offset of the corresponding interference cluster. Grids of a target cell are grouped into interference clusters according to signal to interference plus noise ratios, and an access offset is set for each interference cluster, to ensure service quality and improve user experience.

8 Claims, 5 Drawing Sheets

(51) Int. Cl.
*H04B 17/327* (2015.01)
*H04W 36/14* (2009.01)
*H04B 17/336* (2015.01)
*H04W 36/00* (2009.01)
*H04W 36/30* (2009.01)
*H04W 48/20* (2009.01)
*H04B 17/382* (2015.01)

(52) U.S. Cl.
CPC ......... *H04B 17/345* (2015.01); *H04B 17/382* (2015.01); *H04W 36/0061* (2013.01); *H04W 36/14* (2013.01); *H04W 36/30* (2013.01); *H04W 48/20* (2013.01)

(56) References Cited

FOREIGN PATENT DOCUMENTS

| | | |
|---|---|---|
| CN | 102149137 A | 8/2011 |
| CN | 103841602 A | 6/2014 |

OTHER PUBLICATIONS

International Search Report, dated Aug. 28, 2015, in International Application No. PCT/CN2014/091245 (4 pp.).

* cited by examiner

ACCESS CONTROL METHOD AND APPARATUS, AND NETWORK DEVICE

CROSS-REFERENCE TO RELATED APPLICATIONS

This application is a continuation of International Application No. PCT/CN2014/091245, filed on Nov. 17, 2014, the disclosure of which is hereby incorporated by reference in its entirety.

TECHNICAL FIELD

The present disclosure relates to the field of wireless communications technologies, and specifically, to an access control method and apparatus, and a network device.

BACKGROUND

With continuous enrichment of wireless service types, an increasingly high requirement on a transmission rate of a service is imposed, and a capacity of a wireless network needs to be expanded gradually to meet the increasing high requirement. To increase a network capacity, wireless network miniaturization and densification are development trends of the wireless network. However, such miniaturized and dense wireless network has characteristics such as a large quantity of access points, high site density, high user fluidity, and strong mobility; consequently, interference of the network is very strong and highly dynamic.

For a user selecting a wireless access point based on a signal strength, strong interference may cause interruption of a service of the user, and highly dynamic interference may cause load of the wireless access point to be unbalanced, thereby affecting service quality and user experience.

Therefore, in the miniaturized and dense wireless network, how to effectively perform access control to improve network performance and ensure service quality and user experience is an important issue in future development of the wireless network.

SUMMARY

The present invention provides an access control method and apparatus, and a network device, to implement effective access control in a miniaturized and dense wireless network, improve network performance, and ensure service quality and user experience.

A first aspect of the present invention provides an access control method, including:

performing grid partitioning on a target cell covered by a wireless access point, to obtain multiple grids;

grouping, based on a neighboring cell of the target cell, grids that satisfy a preset condition in the multiple grids into one or more interference clusters;

calculating an access offset of each of the one or more interference clusters; and sending, to a user in each interference cluster, an access offset of a corresponding interference cluster, so that the user selects a cell based on the access offset of the corresponding interference cluster.

In a first possible implementation manner of the first aspect, the grouping, based on a neighboring cell of the target cell, grids that satisfy a preset condition in the multiple grids into one or more interference clusters includes:

calculating a signal to interference plus noise ratio of each of the multiple grids;

determining grids whose signal to interference plus noise ratios are less than a preset threshold; and for the grids whose signal to interference plus noise ratios are less than the preset threshold, grouping grids having a same strongest interfering neighboring cell into a same interference cluster.

According to the first possible implementation manner of the first aspect, in a second possible implementation manner of the first aspect, the calculating a signal to interference plus noise ratio of each of the multiple grids includes:

obtaining statistical load of the target cell and the neighboring cell by sequentially collecting statistics on the target cell and the neighboring cell;

sequentially calculating, for each of the multiple grids, large-scale fading of each grid according to formula (1):

$$g_{i,p} = \frac{RSRP_{i,p}}{P_i} \quad (1)$$

where $g_{i,p}$ is large-scale fading of any grid p corresponding to a cell i in the multiple grids, the cell i includes the target cell and the neighboring cell, $RSRP_{i,p}$ is a reference signal received power of the grid p corresponding to the cell i, and $P_i$ is a pilot transmit power of the cell i; and calculating a signal to interference plus noise ratio of the grid p according to formula (2):

$$SINR_p = \frac{P_t g_{t,p}}{\sum_{l \neq t} P_l g_{l,p} \rho_l + \sigma^2} \quad (2)$$

where $SINR_p$ is the signal to interference plus noise ratio of the grid p, t indicates a target cell t, l indicates a neighboring cell l of the target cell t, $P_t$ is a pilot transmit power of the target cell t, $P_l$ is a pilot transmit power of the neighboring cell l, $g_{t,p}$ is large-scale fading of the grid p corresponding to the target cell t, $g_{l,p}$ is large-scale fading of the grid p corresponding to the neighboring cell t, $\rho_l$ is statistical load of the neighboring cell l, and $\sigma^2$ is a noise power of the target cell t.

According to the first aspect or the first or the second implementation manner of the first aspect, in a third possible implementation manner of the first aspect, the calculating an access offset of each of the one or more interference clusters includes:

obtaining the statistical load of the target cell and the neighboring cell; and sequentially for each of the one or more interference clusters, when the statistical load of the neighboring cell corresponding to the interference cluster is greater than the statistical load of the target cell, setting the access offset of the interference cluster to $\alpha \log(\rho_2/\rho_1)$, where $\alpha$ is a parameter of the target cell, $\rho_1$ is the statistical load of the target cell, and $\rho_2$ is the statistical load of the neighboring cell corresponding to the interference cluster; or when the statistical load of the neighboring cell corresponding to the interference cluster is less than or equal to the statistical load of the target cell, setting, based on reference signal received powers of grids in the interference cluster, the access offset of the interference cluster.

According to the third possible implementation manner of the first aspect, in a fourth possible implementation manner of the first aspect, the setting, based on reference signal received powers of grids in the interference cluster, the access offset of the interference cluster includes:

determining a first grid and a second grid, where the first grid is a grid having a maximum signal to interference plus noise ratio in the interference cluster, and the second grid is a grid having a minimum signal to interference plus noise ratio in the interference cluster;

obtaining a first reference signal received power and a second reference signal received power, where the first reference signal received power is a reference signal received power of the first grid corresponding to the target cell, and the second reference signal received power is a reference signal received power of the second grid corresponding to the target cell;

calculating a difference between the first reference signal received power and the second reference signal received power and an absolute value of the difference; and setting a negative value of the absolute value as the access offset of the interference cluster.

A second aspect of the present invention provides an access control apparatus, including:

a partitioning module, configured to perform grid partitioning on a target cell covered by a wireless access point, to obtain multiple grids; and group, based on a neighboring cell of the target cell, grids that satisfy a preset condition in the multiple grids into one or more interference clusters;

a processing module, configured to calculate an access offset of each of the one or more interference clusters that are obtained through grouping by the partitioning module; and a sending module, configured to send, to a user in each interference cluster, an access offset of a corresponding interference cluster obtained by the processing module, so that the user selects a cell based on the access offset of the corresponding interference cluster.

In a first possible implementation manner of the second aspect, the grouping, based on a neighboring cell of the target cell, grids that satisfy a preset condition in the multiple grids into one or more interference clusters includes:

calculating a signal to interference plus noise ratio of each of the multiple grids;

determining grids whose signal to interference plus noise ratios are less than a preset threshold; and for the grids whose signal to interference plus noise ratios are less than the preset threshold, grouping grids having a same strongest interfering neighboring cell into a same interference cluster.

According to the first possible implementation manner of the second aspect, in a second possible implementation manner of the second aspect, the calculating a signal to interference plus noise ratio of each of the multiple grids includes:

obtaining statistical load of the target cell and the neighboring cell by sequentially collecting statistics on the target cell and the neighboring cell;

sequentially calculating, for each of the multiple grids, large-scale fading of each grid according to formula (1):

$$g_{i,p} = \frac{RSRP_{i,p}}{P_i} \quad (1)$$

where $g_{i,p}$ is large-scale fading of any grid p corresponding to a cell i in the multiple grids, the cell i includes the target cell and the neighboring cell, $RSRP_{i,p}$ is a reference signal received power of the grid p corresponding to the cell i, and $P_i$ is a pilot transmit power of the cell i; and calculating a signal to interference plus noise ratio of the grid p according to formula (2):

$$SINR_p = \frac{P_t g_{t,p}}{\Sigma_{l \neq t} P_l g_{l,p} \rho_l + \sigma^2} \quad (2)$$

where $SINR_p$ is the signal to interference plus noise ratio of the grid p, t indicates a target cell t, l indicates a neighboring cell l of the target cell t, $P_t$ is a pilot transmit power of the target cell t, $P_l$ is a pilot transmit power of the neighboring cell l, $g_{t,p}$ is large-scale fading of the grip p corresponding to the target cell, $g_{l,p}$ is large-scale facing of the grip p corresponding to the neighboring cell t, $\rho_l$ is statistical load of the neighboring cell l, and $\sigma^2$ is a noise power of the target cell t.

According to the second aspect or the first or the second implementation manner of the second aspect, in a third possible implementation manner of the second aspect, the calculating an access offset of each of the one or more interference clusters that are obtained through grouping by the partitioning module includes:

obtaining the statistical load of the target cell and the neighboring cell; and sequentially for each of the one or more interference clusters, when the statistical load of the neighboring cell corresponding to the interference cluster is greater than the statistical load of the target cell, setting the access offset of the interference cluster to $\alpha \log(\rho_2/\rho_1)$, where $\alpha$ is a parameter of the target cell, $\rho_1$ is the statistical load of the target cell, and $\rho^2$ is the statistical load of the neighboring cell corresponding to the interference cluster; or when the statistical load of the neighboring cell corresponding to the interference cluster is less than or equal to the statistical load of the target cell, setting, based on reference signal received powers of grids in the interference cluster, the access offset of the interference cluster.

According to the third possible implementation manner of the second aspect, in a fourth possible implementation manner of the second aspect, the setting, based on reference signal received powers of grids in the interference cluster, the access offset of the interference cluster includes:

determining a first grid and a second grid, where the first grid is a grid having a maximum signal to interference plus noise ratio in the interference cluster, and the second grid is a grid having a minimum signal to interference plus noise ratio in the interference cluster;

obtaining a first reference signal received power and a second reference signal received power, where the first reference signal received power is a reference signal received power of the first grid corresponding to the target cell, and the second reference signal received power is a reference signal received power of the second grid corresponding to the target cell;

calculating a difference between the first reference signal received power and the second reference signal received power and an absolute value of the difference; and setting a negative value of the absolute value as the access offset of the interference cluster.

A third aspect of the present invention provides a network device, including:

a processor, a memory, a transmitter, and a bus, where the processor, the memory, and the transmitter are connected by using the bus so as to transmit data, and the memory is configured to store data processed by the processor;

the processor is configured to: perform grid partitioning on a target cell covered by a wireless access point, to obtain multiple grids; group, based on a neighboring cell of the target cell, grids that satisfy a preset condition in the multiple grids into one or more interference clusters; and calculate an access offset of each of the one or more interference clusters; and the transmitter is configured to send, to a user in each interference cluster, an access offset of a corresponding interference cluster obtained by the processor, so that the user selects a cell based on the access offset of the corresponding interference cluster.

In a first possible implementation manner of the third aspect, the grouping, based on a neighboring cell of the target cell, grids that satisfy a preset condition in the multiple grids into one or more interference clusters includes:

calculating a signal to interference plus noise ratio of each of the multiple grids;

determining grids whose signal to interference plus noise ratios are less than a preset threshold; and for the grids whose signal to interference plus noise ratios are less than the preset threshold, grouping grids having a same strongest interfering neighboring cell into a same interference cluster.

According to the first possible implementation manner of the third aspect, in a second possible implementation manner of the third aspect, the calculating a signal to interference plus noise ratio of each of the multiple grids includes:

obtaining statistical load of the target cell and the neighboring cell by sequentially collecting statistics on the target cell and the neighboring cell;

sequentially calculating, for each of the multiple grids, large-scale fading of each grid according to formula (1):

$$g_{i,p} = \frac{RSRP_{i,p}}{P_i} \quad (1)$$

where $g_{i,p}$ is large-scale fading of any grid p corresponding to a cell i in the multiple grids, the cell i includes the target cell and the neighboring cell, $RSRP_{i,p}$ is a reference signal received power of the grid p corresponding to the cell i, and $P_i$ is a pilot transmit power of the cell i; and calculating a signal to interference plus noise ratio of the grid p according to formula (2):

$$SINR_p = \frac{P_t g_{t,p}}{\Sigma_{l \neq t} P_l g_{l,p} \rho_l + \sigma^2} \quad (2)$$

where $SINR_p$ is the signal to interference plus noise ratio of the grid p, t indicates a target cell t, l indicates a neighboring cell l of the target cell t, $P_t$ is a pilot transmit power of the target cell t, $P_l$ is a pilot transmit power of the neighboring cell l, $g_{t,p}$ is large-scale fading of the grid p corresponding to the target cell t, $g_{l,p}$ is large-scale fading of the grid p corresponding to the neighboring cell t, $\rho_l$ is statistical load of the neighboring cell l, and $\sigma^2$ is a noise power of the target cell t.

According to the third aspect or the first or the second implementation manner of the third aspect, in a third possible implementation manner of the third aspect, the calculating an access offset of each of the one or more interference clusters includes:

obtaining the statistical load of the target cell and the neighboring cell; and sequentially for each of the one or more interference clusters, when the statistical load of the neighboring cell corresponding to the interference cluster is greater than the statistical load of the target cell, setting the access offset of the interference cluster to $\alpha \log(\rho_2/\rho_1)$, where $\alpha$ is a parameter of the target cell, $\rho_1$ is the statistical load of the target cell, and $\rho_2$ is the statistical load of the neighboring cell corresponding to the interference cluster; or when the statistical load of the neighboring cell corresponding to the interference cluster is less than or equal to the statistical load of the target cell, setting, based on reference signal received powers of grids in the interference cluster, the access offset of the interference cluster.

According to the third possible implementation manner of the third aspect, in a fourth possible implementation manner of the third aspect, the setting, based on reference signal received powers of grids in the interference cluster, the access offset of the interference cluster includes:

determining a first grid and a second grid, where the first grid is a grid having a maximum signal to interference plus noise ratio in the interference cluster, and the second grid is a grid having a minimum signal to interference plus noise ratio in the interference cluster;

obtaining a first reference signal received power and a second reference signal received power, where the first reference signal received power is a reference signal received power of the first grid corresponding to the target cell, and the second reference signal received power is a reference signal received power of the second grid corresponding to the target cell;

calculating a difference between the first reference signal received power and the second reference signal received power and an absolute value of the difference; and setting a negative value of the absolute value as the access offset of the interference cluster.

According to the access control method and apparatus, and the network device provided in the present invention, a target cell is partitioned into grids, and interference clusters are further obtained through grouping based on neighboring cells of the target cell, to distinguish grids having different interferences from each other, so that girds having similar interferences may be grouped into one interference cluster, facilitating separate and specific processing for each interference cluster. Then, an access offset of each interference cluster is calculated, and the access offset is sent to the corresponding interference cluster, so that a user in the corresponding interference cluster selects a cell, thereby implementing that different interference clusters are obtained through grouping according to the different interferences and specific processing is performed on different interference clusters. In this way, the access offset of each interference cluster can be dynamically set, to improve cell-edge spectral efficiency and load balance and better ensure service quality and user experience.

BRIEF DESCRIPTION OF DRAWINGS

To describe the technical solutions in the embodiments of the present invention more clearly, the following briefly introduces the accompanying drawings required for describing the embodiments or in the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Because users are unevenly distributed, a wireless access point receives different interferences from a neighboring cell, consequently, it is unreasonable to set a uniform access offset for the whole area covered by the wireless access point. In addition, the user density is not equivalent to load, and setting the access offset according to only the user density may aggravate load unbalance.

A method provided in embodiments of the present invention is applicable to any scenario in which access control is performed on a wireless access point in a wireless communications network. Specifically, the wireless access point may be any device that can provide wireless access for a user, for example, a base station, a wireless router, and the like. The method provided in the embodiments of the present invention is especially applicable to access control on a micro base station.

Figure 1:
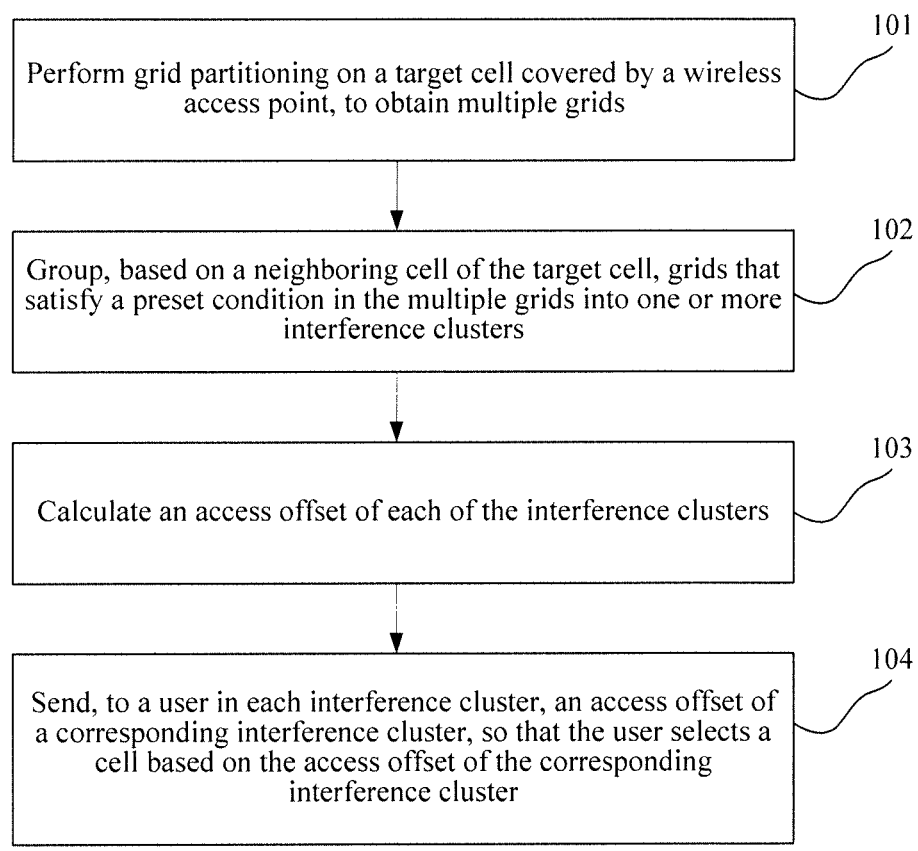
FIG. 1 is a flowchart of an access control method according to Embodiment 1 of the prevent invention.

FIG. 1 is a flowchart of an access control method according to Embodiment 1 of the prevent invention. The method provided in this embodiment is applicable to a scenario in which access control is implemented by means of interference cluster grouping in any wireless communications network, and is especially applicable to a mobile cellular network and a next-generation mobile communications network. As shown in FIG. 1, the method specifically includes:

Step 101: Perform grid partitioning on a target cell covered by a wireless access point, to obtain multiple grids.

Step 102: Group, based on a neighboring cell of the target cell, grids that satisfy a preset condition in the multiple grids into one or more interference clusters.

Step 103: Calculate an access offset of each of the one or more interference clusters.

Step 104: Send, to a user in each interference cluster, an access offset of a corresponding interference cluster, so that the user selects a cell based on the access offset of the corresponding interference cluster.

In this embodiment, grid partitioning is first performed on a target area covered by a wireless network, to obtain multiple grids. It may be understood that, the target area covered by the wireless network includes multiple wireless access points, and each wireless access point covers a certain area, that is, each wireless access point covers multiple grids.

To implement the objective of access control, in this embodiment of the present invention, grids that satisfy a given condition in the partitioned grids are further grouped into interference clusters, where a basis for the interference cluster grouping is neighboring cells of the target cell, that is, in the grids that satisfy the given condition, grids having a same neighboring cell are grouped into one interference cluster. In addition, the grids that satisfy the given condition generally refer to grids whose signal to interference plus noise ratios are less than the preset threshold or to which interferences are greater than a preset threshold, that is, the given condition refers to a channel quality condition or an interference status of a grid. The access offset of each obtained interference cluster is calculated, and then the calculated access offset of each interference cluster is sent to a user in the corresponding interference cluster, so that the user selects a cell or performs access control according to the received access offset. Using an interference cluster in the one or more interference clusters obtained through grouping as an example, an access offset of the interference cluster is calculated, and then the calculated access offset of the interference cluster is sent to a user in the interference cluster, so that the user in the interference cluster selects a cell or performs access control according to the received access offset.

In this embodiment of the present invention, a specific access offset is calculated by means of interference cluster grouping, so that an access offset received by a user is specific to an interference cluster in which the user is located, thereby implementing more accurate access control, so as to ensure service quality, improve user experience, optimize a system throughput and cell-edge spectral efficiency, and improve load balance between wireless access points.

Figure 2:
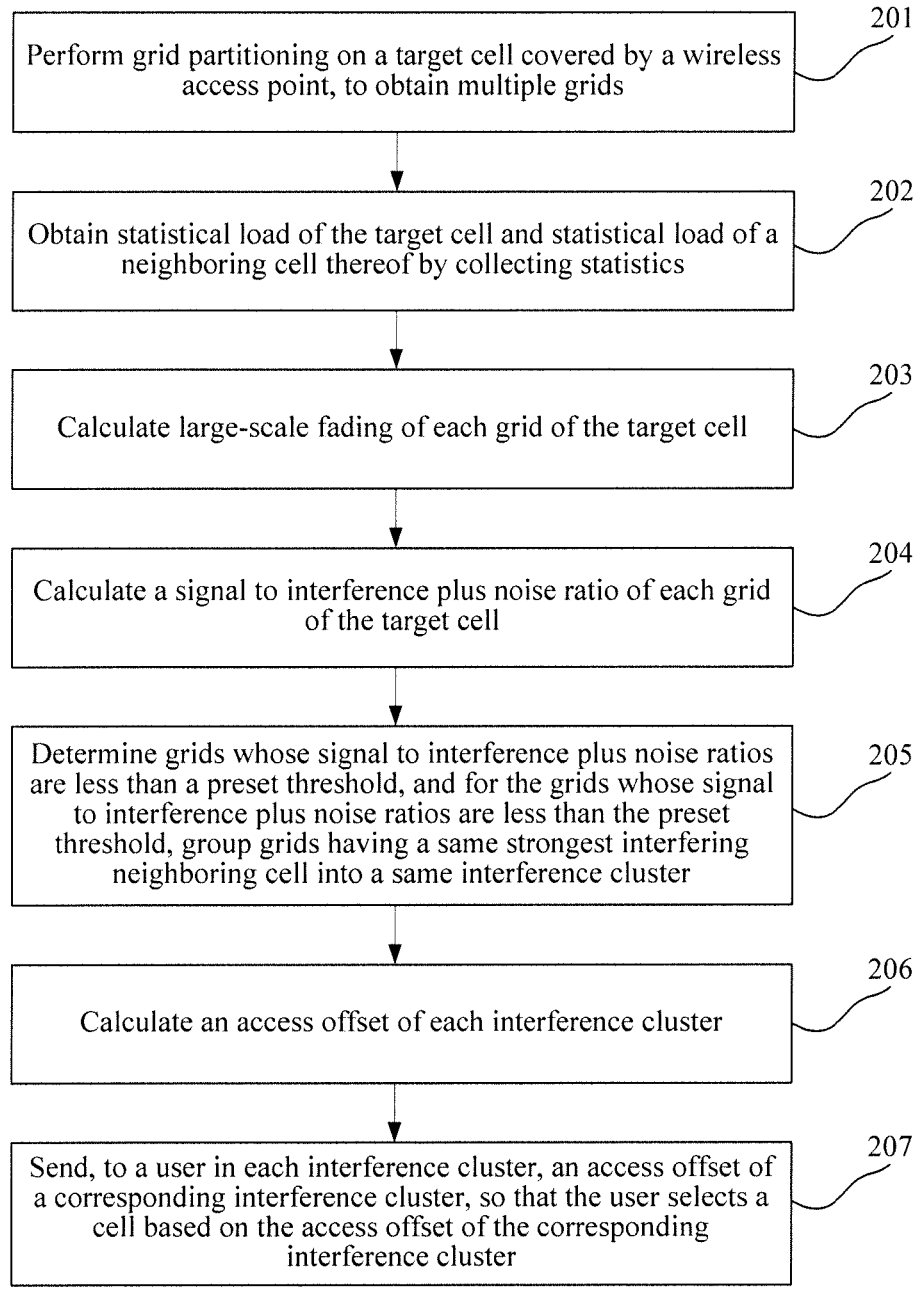
FIG. 2 is a flowchart of an access control method according to Embodiment 2 of the prevent invention.

FIG. 2 is a flowchart of an access control method according to Embodiment 2 of the prevent invention. As shown in FIG. 2, a main procedure of this solution includes:

Step 201: Perform grid partitioning on a target cell covered by a wireless access point, to obtain multiple grids.

An area covered by a wireless network includes multiple wireless access points, and each wireless access point covers a certain area, that is, a corresponding cell of each wireless access point covers multiple grids. A cell corresponding to any one of the wireless access points may be set as the target cell, and the target cell covers multiple grids.

In addition, another method may be applied to obtain multiple grids of the target cell. First, the whole wireless network is partitioned into grids. For each grid, a reference signal received power (RSRP) of the grid corresponding to each wireless access point is obtained, and a wireless access point corresponding to a maximum RSRP is the wireless access point to which the grid belongs. A cell corresponding to any one of the wireless access points may be set as the target cell, and multiple grids covered by the target cell may also be determined. Further, each grid covers a certain area, and therefore, the RSRP refers to an average value of RSRPs obtained at all points in the whole grid. Similarly, an RSRP of a grid corresponding to a cell described in another step also refers to an average value of RSRPs that are obtained at all points in the grid and that correspond to the cell.

Step 202: Obtain statistical load of the target cell and statistical load of a neighboring cell thereof by collecting statistics.

Within a given period of time, statistics on allocated resources in a cell are collected, and a ratio of the allocated resources to total resources is the statistical load of the cell. Accordingly, the statistical load of the target cell and the statistical load of the neighboring cell thereof can be obtained by collecting statistics. Therefore, the target cell may obtain the statistical load of the neighboring cell thereof. In addition, the resources include radio resources or time-frequency resources, for example, a bandwidth. The statistical load of the target cell and the statistical load of the neighboring cell thereof obtained herein may be used in step 204 and step 206.

Step 203: Calculate large-scale fading of each grid of the target cell.

First, the large-scale fading of each grid of the target cell includes large-scale fading of the grid corresponding to the target cell and large-scale fading of the grid corresponding to the neighboring cell of the target cell. Because the target cell may have multiple neighboring cells, each grid may have multiple pieces of large-scale fading.

Figure 3:
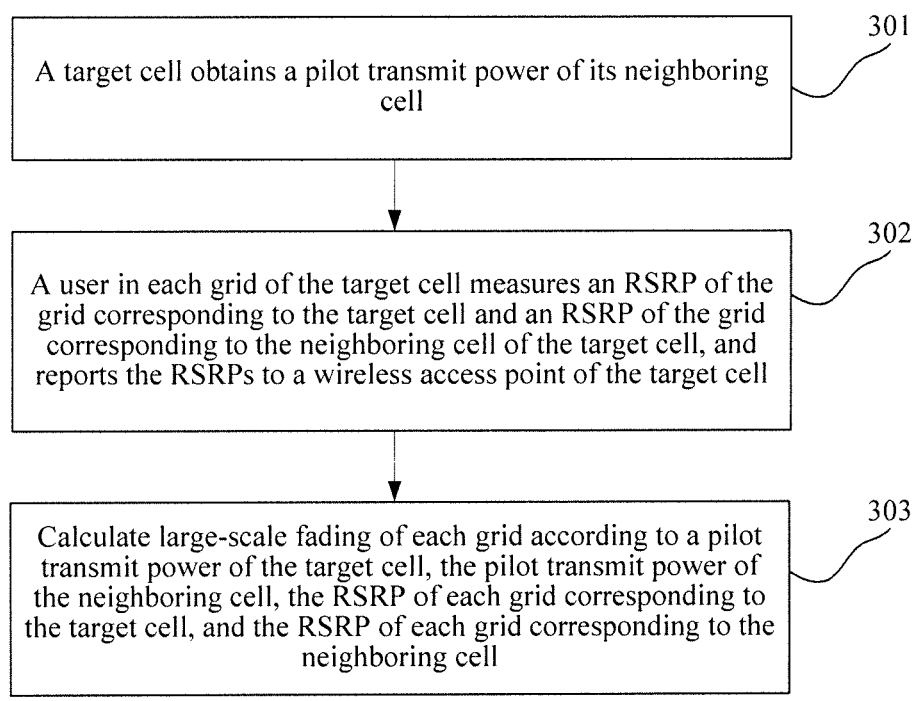
FIG. 3 is a schematic diagram of a method for calculating large-scale fading of each grid of a target cell.

Specifically, FIG. 3 is a schematic diagram of a method for calculating large-scale fading of each grid of the target cell. As shown in FIG. 3, step 203 may include the following specific steps:

Step 301: The target cell obtains a pilot transmit power of its neighboring cell.

Step 302: A user in each grid of the target cell measures an RSRP of the grid corresponding to the target cell and an RSRP of the grid corresponding to the neighboring cell of the target cell, and reports the RSRPs to the wireless access point of the target cell.

Step 303: Calculate the large-scale fading of each grid according to a pilot transmit power of the target cell, the pilot transmit power of the neighboring cell, the RSRP of each grid corresponding to the target cell, and the RSRP of each grid corresponding to the neighboring cell of the target cell.

Further, for step 303, the large-scale fading of each grid is calculated according to formula (1):

$$g_{i,p} = \frac{RSRP_{i,p}}{P_i} \quad (1)$$

where $g_{i,p}$ is large-scale fading of any grid p of the target cell corresponding to a cell i, the cell i includes the target cell and the neighboring cell, $RSRP_{i,p}$ is a reference signal received power of the grid p corresponding to the cell i, and $P_i$ is a pilot transmit power of the cell i.

Reference signs of the specific steps included in step 203 are merely indicative, but do not represent an execution sequence. Step 301 and step 302 may be performed simultaneously, or may be performed in any order.

Step 204: Calculate a signal to interference plus noise ratio of each grid of the target cell.

The target cell obtains the statistical load of its neighboring cell, and calculates a signal to interference plus noise ratio of any grid p according to formula (2):

$$SINR_p = \frac{P_t g_{t,p}}{\Sigma_{l \neq t} P_l g_{l,p} \rho_l + \sigma^2} \quad (2)$$

where $SINR_p$ is the signal to interference plus noise ratio of the grid p, t indicates a target cell t, l indicates a neighboring cell l of the target cell t, $P_t$ is a pilot transmit power of the target cell t, $P_l$ is a pilot transmit power of the neighboring cell l, $g_{t,p}$ is large-scale fading of the grid p corresponding to the target cell t, $g_{l,p}$ is large-scale fading of the grid p corresponding to the neighboring cell t, $\rho_l$ is statistical load of the neighboring cell l, and $\sigma^2$ is a noise power of the target cell t.

When the signal to interference plus noise ratio of the grid in the target cell is calculated, the statistical load condition of the neighboring cell is considered, so that interference from the neighboring cell to the target cell is more accurately reflected in the signal to interference plus noise ratio, and a result obtained through calculation more accurately reflects a real situation.

Step 205: Determine grids whose signal to interference plus noise ratios are less than a preset threshold, and for the grids whose signal to interference plus noise ratios are less than the preset threshold, group grids having a same strongest interfering neighboring cell into a same interference cluster.

Specifically, strength of signals sent from neighboring cells may be measured in a grid of the target cell, and a neighboring cell corresponding to a strongest signal is the strongest interfering neighboring cell of the grid. Accordingly, grids having a same strongest interfering neighboring cell are grouped into a same interference cluster. That is, in the same interference cluster, the strongest interfering neighboring cell is a neighboring cell corresponding to the interference cluster. That is, one interference cluster includes one or more grids having the same strongest interfering neighboring cell. In this manner, grids that satisfy the condition are grouped into the one or more interference clusters.

Grids that are interfered to some extent are determined according to the signal to interference plus noise ratios. These grids are grouped, based on neighboring cells of the target cell, into interference clusters to distinguish grids having different interferences from each other, so that grids having similar interferences are grouped into one interference cluster, facilitating separate and specific calculation of an access offset of each interference cluster.

Step 206: Calculate an access offset of each interference cluster.

The access offset of each interference cluster is sequentially set for each interference cluster in the following manner:

when statistical load of a neighboring cell corresponding to an interference cluster is greater than the statistical load of the target cell, setting the access offset of the interference cluster to $\alpha \log(\rho_2/\rho_1)$, where α where a is a parameter of the target cell and may be set to 1 or set to another value according to a specific situation, $\rho_1$ is the statistical load of the target cell, and $\rho_2$ is the statistical load of the neighboring cell corresponding to the interference cluster; or when statistical load of a neighboring cell corresponding to an interference cluster is less than or equal to the statistical load of the target cell, setting the access offset of the interference cluster based on RSRPs of grids in the interference cluster.

Specifically, a neighboring cell corresponding to an interference cluster refers to a neighboring cell on which grouping of the interference cluster is based.

Figure 4:
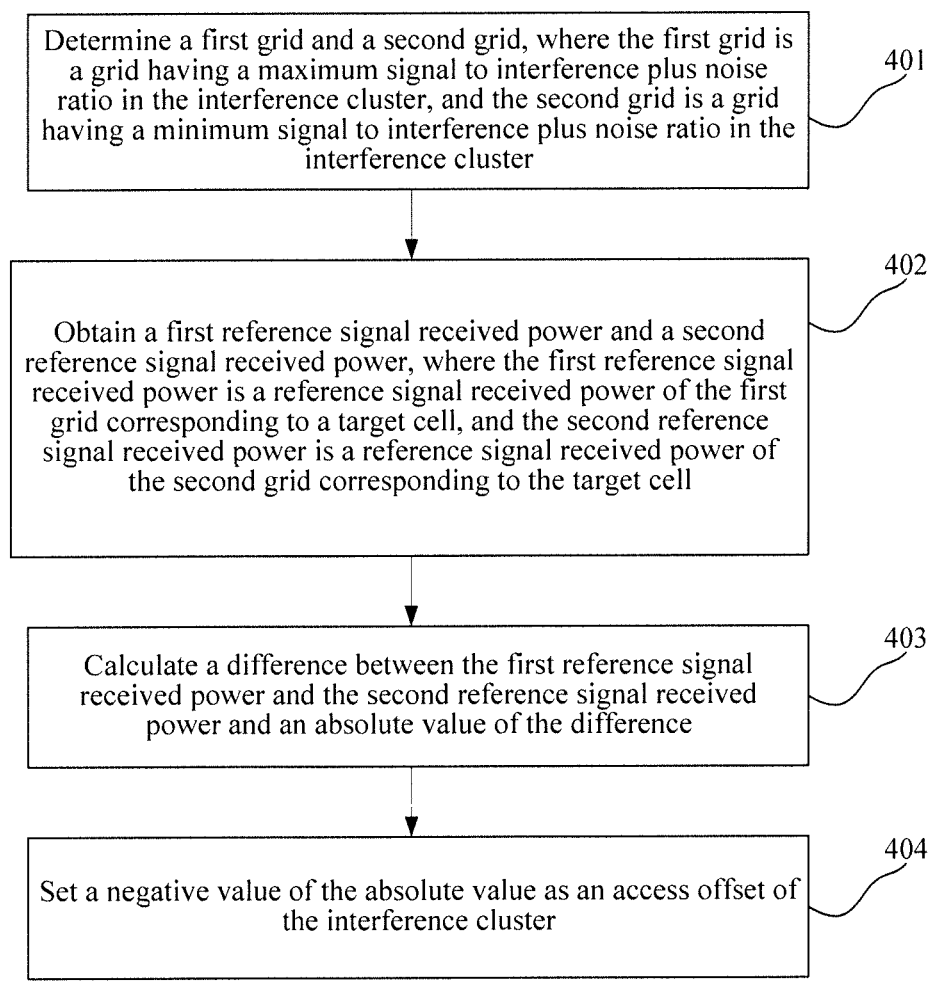
FIG. 4 is a schematic diagram of a method for setting an access offset of an interference cluster based on a reference signal received power.

Further, FIG. 4 is a schematic diagram of a method for setting an access offset of an interference cluster based on a reference signal received power. As shown in FIG. 4, the setting the access offset of the interference cluster based on RSRPs of grids in the interference cluster includes the following specific steps:

Step 401: Determine a first grid and a second grid, where the first grid is a grid having a maximum signal to interference plus noise ratio in the interference cluster, and the second grid is a grid having a minimum signal to interference plus noise ratio in the interference cluster.

Step 402: Obtain a first reference signal received power and a second reference signal received power, where the first reference signal received power is a reference signal received power of the first grid corresponding to the target cell, and the second reference signal received power is a reference signal received power of the second grid corresponding to the target cell.

Step 403: Calculate a difference between the first reference signal received power and the second reference signal received power and an absolute value of the difference.

Step 404: Set a negative value of the absolute value as the access offset of the interference cluster.

By setting access offsets for the interference clusters, setting a uniform access offset for the whole cell can be avoided, and the access offset is set at a smaller granularity, so that setting of the access offset is more accurate, and is more specific.

Step 207: Send, to a user in each interference cluster, an access offset of a corresponding interference cluster, so that the user selects a cell based on the access offset of the corresponding interference cluster.

Users in different interference clusters may suffer different interferences, and may receive different access offsets. However, the access offset is calculated according to the interference to the interference cluster, so that service quality and user experience can be effectively ensured.

Step 201 to step 207 may be triggered according to an event or periodically triggered to be repeatedly performed. For example, the method in this embodiment is triggered according to a load change of the target cell or an interval time for setting the access offset, so that the access offset of the target cell can be dynamically set. In addition, except for interference cluster grouping and setting of the access offset for each interference cluster, step 201 to 204 may be implemented by using another equivalent method. This should also fall within the protection scope of the present invention without creative efforts.

In this embodiment, grids of a target cell are grouped into interference clusters according to signal to interference plus noise ratios, and an access offset is set for each interference cluster, to ensure service quality, improve user experience, optimize a system throughput and cell-edge spectral efficiency, and improve load balance between wireless access points.

It should be understood that, "sequentially for each interference cluster" or "sequentially for the target cell and its neighboring cell" or "sequentially for each grid" in the present invention means that each interference cluster, or the target cell and its neighboring cell, or each grid needs to be traversed, and a sequence of the traversed interference clusters, cells, or grids is not limited. Therefore, the traversing sequence may be random.

Figure 5:
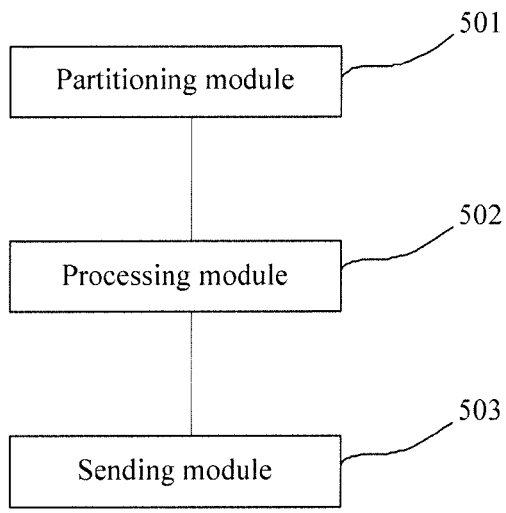
FIG. 5 is a schematic diagram of an access control apparatus according to an embodiment of the prevent invention.

Corresponding to the foregoing method embodiment, an embodiment of the present invention further provides an access control apparatus, to implement the access control method provided in the method embodiment. As shown in FIG. 5, the access control apparatus includes:

a partitioning module 501, configured to perform grid partitioning on a target cell covered by a wireless access point, to obtain multiple grids; and group, based on a neighboring cell of the target cell, grids that satisfy a preset condition in the multiple grids into one or more interference clusters;

a processing module 502, configured to calculate an access offset of each of the one or more interference clusters that are obtained through grouping by the partitioning module 501; and a sending module 503, configured to send, to a user in each interference cluster, an access offset of a corresponding interference cluster obtained by the processing module 502, so that the user selects a cell based on the access offset of the corresponding interference cluster.

Some involved technical features such as grids, interference clusters, and access offsets are similar to or correspond to some technical features involved in the processing procedure of the method embodiment, and are not repeatedly described in this embodiment again.

Figure 6:
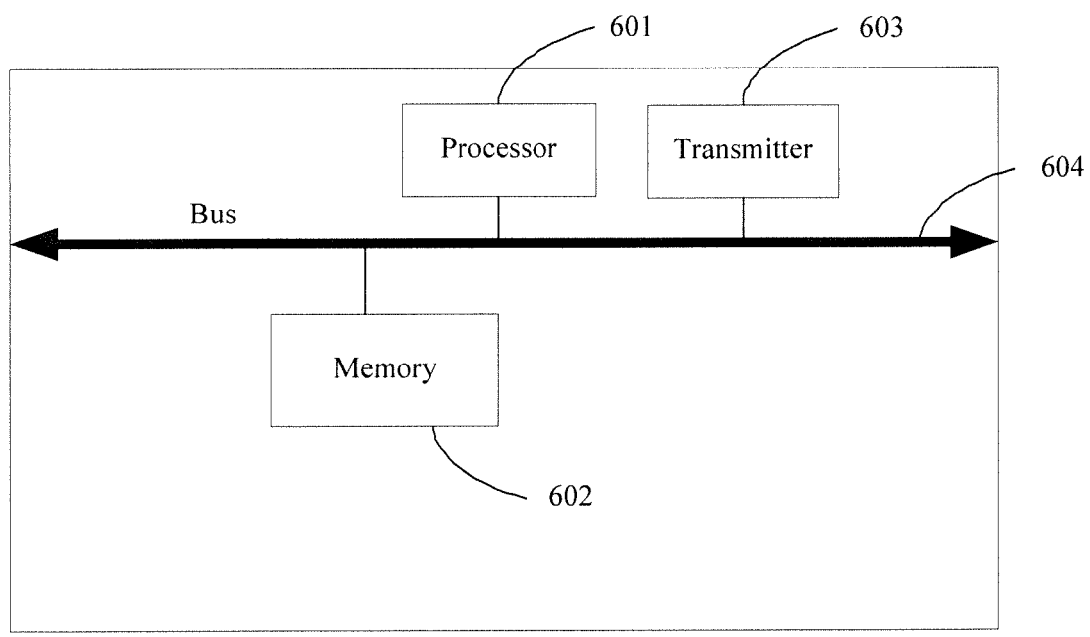
FIG. 6 is a schematic diagram of a network device according to an embodiment of the present invention.

An embodiment of the present invention provides a network device. As shown in FIG. 6, the network device includes: a processor 601, a memory 602, a transmitter 603, and a bus 604, where the processor 601, the memory 602, and the transmitter 603 are connected by using the bus 604 so as to transmit data, and the memory 602 is configured to store data processed by the processor 601.

The bus 604 may be an Industry Standard Architecture (ISA) bus, a Peripheral Component Interconnect (PCI) bus, an Extended Industry Standard Architecture (EISA) bus, or the like. This is not limited herein. The bus 604 may be grouped into an address bus, a data bus, a control bus, and the like. For ease of representation, the bus 604 in FIG. 6 is represented by using only one bold line, but it does not indicate that there is only one bus or only one type of bus.

The memory 602 is configured to store data or executable program code, where the program code includes operating instructions of a computer, and specifically may be an operating system, an application, and the like. The memory 602 may include a high-speed RAM memory, and may further include a non-volatile memory, such as at least one magnetic disk memory.

The processor 601 may be a central processing unit (CPU), or an application specific integrated circuit (ASIC), or may be configured into one or more integrated circuits for implementing the embodiments of the present invention.

The processor 601 is configured to implement the access control method in the foregoing method embodiment by executing the program code stored in the memory 602.

The access control apparatus specifically includes:

the processor 601, configured to: perform grid partitioning on a target cell covered by a wireless access point, to obtain multiple grids; group, based on a neighboring cell of the target cell, grids that satisfy a preset condition in the multiple grids into one or more interference clusters; and calculate an access offset of each of the one or more interference clusters; and the transmitter 603, configured to send, to a user in each interference cluster, an access offset of a corresponding interference cluster obtained by the processor 601, so that the user selects a cell based on the access offset of the corresponding interference cluster.

Some involved technical features such as grids, interference clusters, and access offsets are similar to or correspond to some technical features involved in the processing procedure of the method embodiment, and are not repeatedly described in this embodiment again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method of access control, comprising:
performing grid partitioning on a target cell covered by a wireless access point, to obtain multiple grids;
grouping, based on a neighboring cell of the target cell, grids that satisfy a preset condition in the multiple grids into one or more interference clusters;
calculating an access offset of each of the one or more interference clusters; and
sending, to a user in each interference cluster, an access offset of a corresponding interference cluster, so that the user selects a cell based on the access offset of the corresponding interference cluster;
wherein the grouping, based on a neighboring cell of the target cell, grids that satisfy a preset condition in the multiple grids into one or more interference clusters comprises:
calculating a signal to interference plus noise ratio of each of the multiple grids;
determining grids whose signal to interference plus noise ratios are less than a preset threshold; and
for the grids whose signal to interference plus noise ratios are less than the preset threshold, grouping grids having a same strongest interfering neighboring cell into a same interference cluster.

2. The method according to claim 1, wherein
the calculating a signal to interference plus noise ratio of each of the multiple grids comprises:
obtaining statistical load of the target cell and the neighboring cell by sequentially collecting statistics on the target cell and the neighboring cell;
sequentially calculating, for each of the multiple grids, large-scale fading of each grid according to formula (1):

$$g_{i,p} = \frac{RSRP_{i,p}}{P_i} \quad (1)$$

wherein $g_{i,p}$ is large-scale fading of any grid p corresponding to a cell i in the multiple grids, the cell i comprises the target cell and the neighboring cell, $RSRP_{i,p}$ is a reference signal received power of the grid p corresponding to the cell i, and $P_i$ is a pilot transmit power of the cell i; and calculating a signal to interference plus noise ratio of the grid p according to formula (2):

$$SINR_p = \frac{P_t g_{t,p}}{\sum_{l \neq t} P_l g_{l,p} \rho_l + \sigma^2} \quad (2)$$

wherein $SINR_p$ is the signal to interference plus noise ratio of the grid p, t indicates a target cell t, l indicates a neighboring cell l of the target cell t, $P_t$ is a pilot transmit power of the target cell t, $P_l$ is a pilot transmit power of the neighboring cell l, $g_{t,p}$ is large-scale fading of the grid p corresponding to the target cell t, $g_{l,p}$ is large-scale fading of the grid p corresponding to the neighboring cell t, $\rho_l$ is statistical load of the neighboring cell l, and $\sigma^2$ is a noise power of the target cell t.

3. The method according to claim 1, wherein
the calculating an access offset of each of the one or more interference clusters comprises:
obtaining the statistical load of the target cell and the neighboring cell; and
sequentially for each of the one or more interference clusters,
when the statistical load of the neighboring cell corresponding to the interference cluster is greater than the statistical load of the target cell, setting the access offset of the interference cluster to $\alpha \log(\rho_2/\rho_1)$ wherein $\alpha$ is a parameter of the target cell, $\rho_1$ is the statistical load of the target cell, and $\rho_2$ is the statistical load of the neighboring cell corresponding to the interference cluster; or
when the statistical load of the neighboring cell corresponding to the interference cluster is less than or equal to the statistical load of the target cell, setting, based on reference signal received powers of grids in the interference cluster, the access offset of the interference cluster.

4. The method according to claim 3, wherein
the setting, based on reference signal received powers of grids in the interference cluster, the access offset of the interference cluster comprises:
determining a first grid and a second grid, wherein the first grid is a grid having a maximum signal to interference plus noise ratio in the interference cluster, and the second grid is a grid having a minimum signal to interference plus noise ratio in the interference cluster;
obtaining a first reference signal received power and a second reference signal received power, wherein the first reference signal received power is a reference signal received power of the first grid corresponding to the target cell, and the second reference signal received power is a reference signal received power of the second grid corresponding to the target cell;
calculating a difference between the first reference signal received power and the second reference signal received power and an absolute value of the difference; and
setting a negative value of the absolute value as the access offset of the interference cluster.

5. A network device, comprising:
a bus;
a processor coupled to the bus and configured to: perform grid partitioning on a target cell covered by a wireless access point, to obtain multiple grids; group, based on a neighboring cell of the target cell, grids that satisfy a preset condition in the multiple grids into one or more interference clusters; and calculate an access offset of each of the one or more interference clusters;
a transmitter coupled to the bus and configured to send, to a user in each interference cluster, an access offset of a corresponding interference cluster obtained by the processor, so that the user selects a cell based on the access offset of the corresponding interference cluster; and
a memory coupled to the bus and configured to store data processed by the processor;
wherein the group, based on a neighboring cell of the target cell, grids that satisfy a preset condition in the multiple grids into one or more interference clusters comprises:

calculating a signal to interference plus noise ratio of each of the multiple grids;
determining grids whose signal to interference plus noise ratios are less than a preset threshold; and
for the grids whose signal to interference plus noise ratios are less than the preset threshold, grouping grids having a same strongest interfering neighboring cell into a same interference cluster.

6. The network device according to claim 5, wherein
the calculating a signal to interference plus noise ratio of each of the multiple grids comprises:
obtaining statistical load of the target cell and the neighboring cell by sequentially collecting statistics on the target cell and the neighboring cell;
sequentially calculating, for each of the multiple grids, large-scale fading of each grid according to formula (1):

$$g_{i,p} = \frac{RSRP_{i,p}}{P_i} \qquad (1)$$

wherein $g_{i,p}$ is large-scale fading of any grid p corresponding to a cell i in the multiple grids, the cell i comprises the target cell and the neighboring cell, $RSRP_{i,p}$ is a reference signal received power of the grid p corresponding to the cell i, and $P_i$ is a pilot transmit power of the cell i; and calculating a signal to interference plus noise ratio of the grid p according to formula (2):

$$SINR_p = \frac{P_t g_{t,p}}{\Sigma_{l \neq t} P_l g_{l,p} \rho_l + \sigma^2} \qquad (2)$$

wherein $SINR_p$ is the signal to interference plus noise ratio of the grid p, t indicates a target cell t, l indicates a neighboring cell l of the target cell t, $P_t$ is a pilot transmit power of the target cell t, $P_l$ is a pilot transmit power of the neighboring cell l, $g_{t,p}$ is large-scale fading of the grid p corresponding to the target cell t, $g_{l,p}$ is large-scale fading of the grid p corresponding to the neighboring cell t, $\rho_l$ is statistical load of the neighboring cell l, and $\sigma^2$ is a noise power of the target cell t.

7. The network device according to claim 5, wherein
the calculating an access offset of each of the one or more interference clusters comprises:
obtaining the statistical load of the target cell and the neighboring cell; and
sequentially for each of the one or more interference clusters,
when the statistical load of the neighboring cell corresponding to the interference cluster is greater than the statistical load of the target cell, setting the access offset of the interference cluster to $\alpha \log(\rho_2/\rho_1)$, wherein $\alpha$ is a parameter of the target cell, $\rho_1$ is the statistical load of the target cell, and $\rho_2$ is the statistical load of the neighboring cell corresponding to the interference cluster; or
when the statistical load of the neighboring cell corresponding to the interference cluster is less than or equal to the statistical load of the target cell, setting, based on reference signal received powers of grids in the interference cluster, the access offset of the interference cluster.

8. The network device according to claim 7, wherein
the setting, based on reference signal received powers of grids in the interference cluster, the access offset of the interference cluster comprises:
determining a first grid and a second grid, wherein the first grid is a grid having a maximum signal to interference plus noise ratio in the interference cluster, and the second grid is a grid having a minimum signal to interference plus noise ratio in the interference cluster;
obtaining a first reference signal received power and a second reference signal received power, wherein the first reference signal received power is a reference signal received power of the first grid corresponding to the target cell, and the second reference signal received power is a reference signal received power of the second grid corresponding to the target cell;
calculating a difference between the first reference signal received power and the second reference signal received power and an absolute value of the difference; and
setting a negative value of the absolute value as the access offset of the interference cluster.

* * * * *